United States Patent

[11] 3,602,07

| | | |
|---|---|---|
| [72] | Inventors | Kenneth W. Verge<br>Farmington;<br>Donald B. Kantz, Ferndale, Mich. |
| [21] | Appl. No. | 27,308 |
| [22] | Filed | Apr. 10, 1970 |
| [45] | Patented | Aug. 31, 1971 |
| [73] | Assignee | The Bendix Corporation<br>Continuation-in-part of application Ser. No. 780,494, Dec. 2, 1968. |

[54] MECHANICAL TRANSMISSION
13 Claims, 7 Drawing Figs.

| | | |
|---|---|---|
| [52] | U.S. Cl. | 74/804 |
| [51] | Int. Cl. | F16h 1/28 |
| [50] | Field of Search | 74/804, 805 |

[56] References Cited
UNITED STATES PATENTS

| | | | |
|---|---|---|---|
| 987,430 | 3/1911 | Conant | 74/80 |
| 2,609,713 | 9/1952 | Martin et al. | 74/80 |
| 3,056,315 | 10/1962 | Mros | 74/80 |
| 3,320,828 | 5/1967 | Grant | 74/804 |

*Primary Examiner*—Arthur T. McKeon
*Attorneys*—James E. Stephenson, William F. Thornton and Plante, Hartz, Smith and Thompson

ABSTRACT: A rotary-to-rotary transmission comprising concentric stationary and output gears and a coacting floating ring gear which is eccentric thereto and is driven by a drive shaft and roller assembly so that the ring gear axis orbits about the stationary gear axis and drives the output gear.

INVENTORS
KENNETH W. VERGE
DONALD B. KANTZ
BY
Olsen and Stephenson
ATTORNEYS

INVENTORS
KENNETH W. VERGE
DONALD B. KANTZ

BY Olsen and Stephenson
ATTORNEYS

INVENTORS
KENNETH W. VERGE
DONALD B. KANTZ
BY
Olsen and Stephenson
ATTORNEYS

MECHANICAL TRANSMISSION

CROSS-REFERENCE REFERENCE TO RELATED APPLICATIONS

This application is a continuation-in-part of copending application Ser. No. 780,494 filed Dec. 2, 1968. Copending application Ser. No. 667,459, filed Sept. 13, 1967, and assigned to the assignee of this application discloses a motor transmission unit utilizing essentially the same stationary gear, output gear, and ring gear relationship used in this invention.

It is an object of this invention to provide an improved rotary-to-rotary transmission wherein epicyclic movement of a ring gear is utilized for driving an output gear.

A further object of this invention is to provide a rotary-to-rotary transmission which offers significant improvements in torque capacity, size and weight where large reduction ratios are required.

Another object of this invention is to provide an improved transmission which is dynamically balanced and does not require high speed bearings.

The improved transmission of this invention consists essentially of a fixed stationary gear, a concentric rotatably mounted output gear, an eccentric floating ring gear which meshes with the stationary and output gears, and a mechanical drive assembly capable of applying a rotating force vector to the ring gear which will cause it to experience epicyclic movement relative to the stationary gear. The principles of operation of these transmission components providing for drive of the output gear in response to rotation of the force vector to obtain a desired transmission ratio, namely, the ratio of force vector revolutions to output gear revolutions, is set forth in the aforementioned copending application. In the transmission of this invention, the necessary force vector is generated by the mechanical drive assembly consisting of a drive shaft and a cam means which engages the ring gear and is rotated by the drive shaft. In the illustrated forms of the invention, this cam means consists of a plurality of drive shaft driven rollers, one of which is larger than the others. These rollers are mounted on a carrier in one form of the invention and in the other form two sets of rollers cooperate with two ring gears which are 180° out of phase to provide the transmission with desirable dynamic balance characteristics. The transmission of this invention can also take different forms insofar as the assembly of the ring gear with the stationary and output gears is concerned. In one illustrated form of the invention, the ring gear has a single set of teeth which mesh with both the output gear and the stationary gear and movement of the output gear is obtained by forming it with one more tooth than the stationary gear has. In a second illustrated form of the invention, the ring gear is formed with two sets of teeth which mesh separately with the output and stationary gears.

Further objects, features and advantages of the invention will become apparent from a consideration of the following description, the appended claims, and the accompanying drawing in which:

Figures 1, 2:
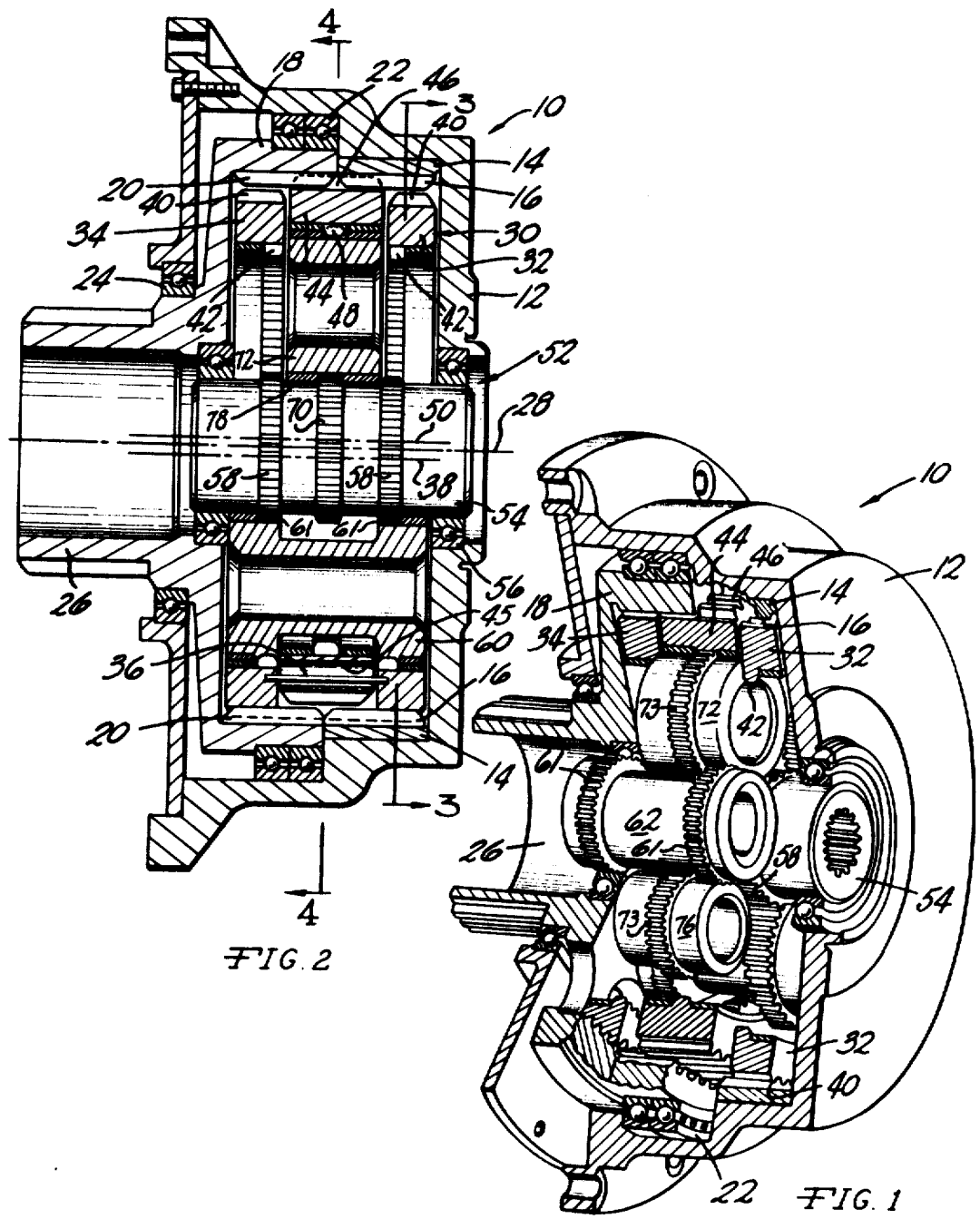
FIG. 1 is a perspective view of one form of the mechanical transmission of this invention, with some parts broken away and other parts shown in section for the purpose of clarity.
FIG. 2 is a longitudinal sectional view of the transmission shown in FIG. 1.
Figure 3:
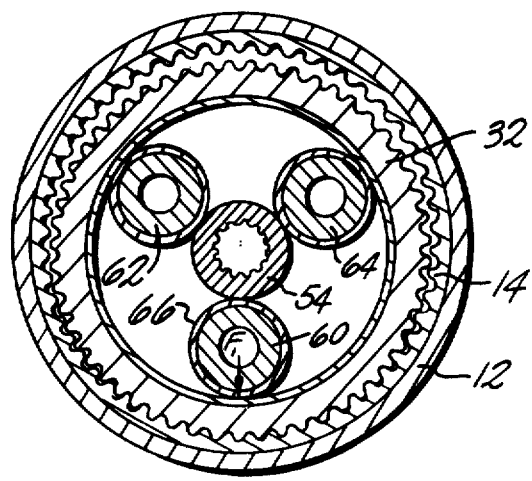
Figure 4:
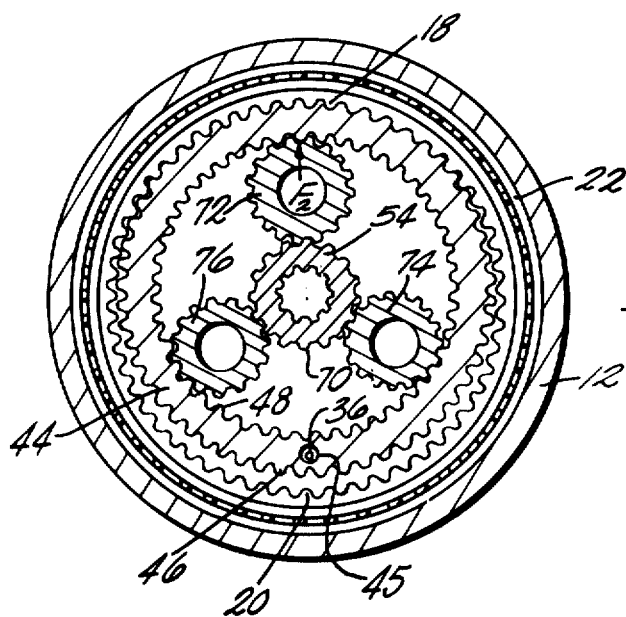
Figure 5:
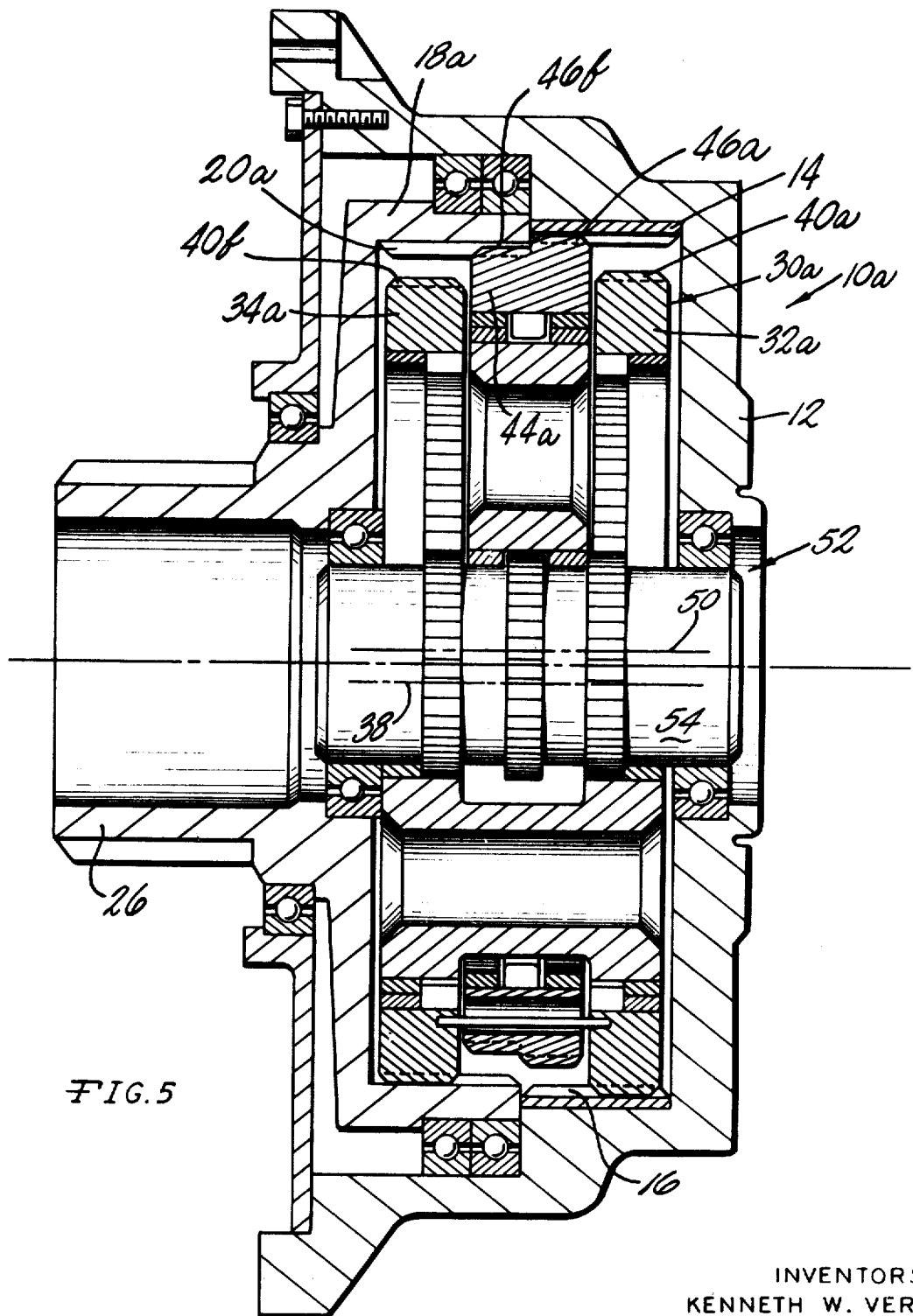
Figure 7:
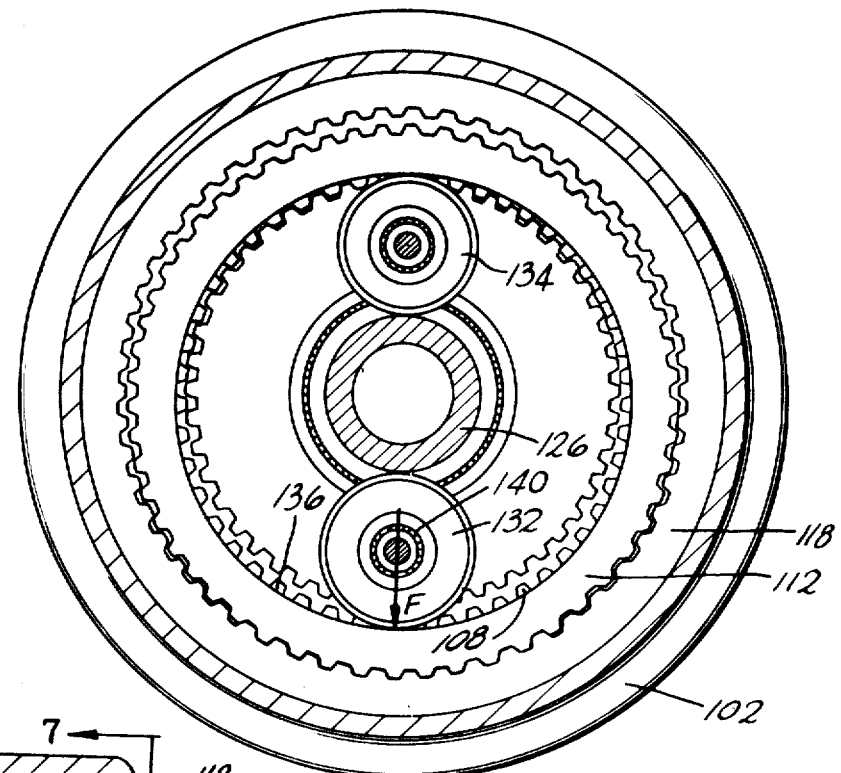
Figure 6:
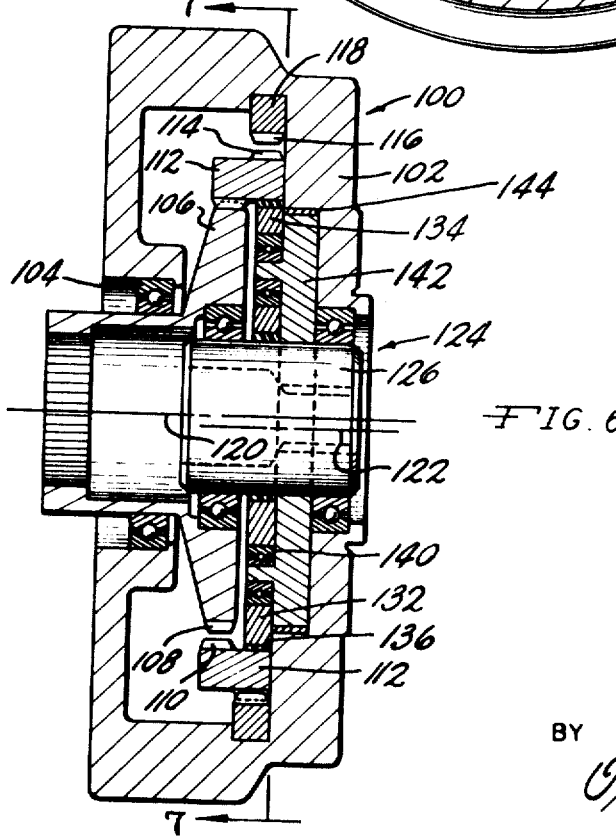

FIGS. 3 and 4 are transverse sectional views of the form of the transmission of this invention shown in FIG. 1 as seen from substantially the lines 3—3 and 4—4, respectively, in FIG. 2, with some parts being omitted form FIG. 4 for the purpose of clarity;

FIG. 5 is a longitudinal sectional view of a modified form of the transmission of this invention;

FIG. 6 is a longitudinal sectional view of another form of the transmission of this invention; and FIG. 7 is a transverse sectional view of the form of the transmission shown in FIG. 5 as seen from substantially the line 7—

With reference to the drawing, the transmission of this invention, indicated generally at 10, is illustrated in FIGS. 1 and 2 as including a housing 12 on which a stationary gear 14 having radially inwardly directed teeth 16 is fixedly mounted. An output gear 18 having radially inwardly directed teeth 20 is rotatably mounted on bearings 22 and 24 carried by the housing 12 and includes an integral output shaft 26 which is suitably connected to whatever mechanism (not shown) is to be driven by the transmission 10. The stationary gear 14 and the output gear 18 are coaxial and concentric and have an axis indicated at 28, the terms "coaxial" and "concentric" being used interchangeably herein to define the relationship of members having a common axis, as distinguished from eccentric. A floating ring 9ear 30, formed in two identical sections 32 and 34 connected by suitable means such as one or more pins, one of which is shown at 36 in FIG. 2, has an axis 38 which is eccentric relative to the axis 28. The ring gear sections 32 and 34 are identical, having radially outwardly extending external teeth 40 and radially inwardly directed internal teeth 42. The external teeth 40 on the section 32 mesh with the teeth 16 on the stationary gear 14 and the external teeth 40 on the section 34 with the teeth on the output gear 18.

A second ring gear 44 of the same diameter as the ring gear 30 has external teeth 46 and internal teeth 48. The external teeth 46, which mesh with the stationary gear teeth 16 and the output gear teeth 20, correspond in size and number to the external teeth 40 on the ring gear 30 and the internal teeth 48 correspond in size and number to the internal teeth 42 on the ring gear 30. The ring gear 44 has an axis 50 which is eccentric with respect to the stationary gear axis 28 and, as shown in FIGS. 1 and 2, the ring gear 44 is positioned so that it is 180° out of phase with the ring gear 30. In other words, the ring gear 44 engages areas of the stationary gear 14 and the output gear 18 which are 180° spaced from the areas of engagement of the ring gear 30 with the stationary gear 14 and the output gear 18. A slot 45 in the ring gear 44 provides clearance for the pin 36 which connects the ring gear sections 32 and 34.

In the transmission 10, the output gear 18 has one more tooth 20 than the number of teeth 16 on the stationary gear 14. This tooth difference provides for rotation of gear 18 relative to gear 14 in response to orbital movement of the floating ring gear means consisting of the gears 30 and 44.

In the transmission 10, the ring gears 30 and 44 are driven so that they roll around the internal circumference of the stationary gear 14. Since the number of teeth 40 and 46 on the ring gears 30 and 44, respectively, are different than the number of gear teeth 16 on the stationary gear 14, and the ring gears 30 and 44 are eccentric with respect to the stationary gear axis 28, the ring gears experience epicyclic movement relative to the stationary gear 14 during travel about the internal circumference of the stationary gear 14. In other words, the ring gear axes 38 and 50 orbit about the stationary gear axis 28.

In the transmission 10, this drive of the ring gears 30 and 44 is accomplished by a drive shaft and cam assembly indicated generally at 52. The assembly 52 includes an internally splined drive shaft 54 adapted to be driven by any suitable power unit (not shown) and supported on bearings 56 carried by the housing 12. A pair of identical sun gears 58 are fixed on the drive shaft 54 and these sun gears 58 are arranged in meshing engagement with two sets of teeth 61 on each of three planet gear rollers 60, 62 and 64 which are arranged in an evenly spaced relation about the shaft 54. Each of the planet gear rollers 60, 62 and 64 is provided with a cover 66 of a material having a high coefficient of friction, such as rubber, and the cover 66 is positioned in rolling engagement with the external surface of the drive shaft 54, as shown in FIG. 3. The gear roller 60 is of a larger diameter than the gear rollers 62 and 64 and, as result, the larger gear roller 60, at the point of its rolling engagement with the ring gear 30 applies a radially outwardly directed force vector, indicated at $F_1$, to the ring gear 30 which maintains the ring gear 30 in engagement with the roller 60, by virtue of its larger diameter, but these teeth have the same pitch line velocity as the pitch line velocity of the teeth 61 on the other gear rollers 62 and 64, so that when the shaft 54 is rotated all of the gear rollers 60, 62 and 64 travel at the same velocity about the axis 28. The teeth 61 on the gear rollers 60, 62 and 64 all mesh with the internal teeth 42 on the ring gear 30 and are maintained in an evenly spaced relation so that as the shaft 54 rotates the force vector $F_1$ is rotated about the axis 28.

A similar sun and planet gear roller assembly is provided for the other ring gear 44. This assembly consists of a sun gear 70 secured to the shaft 54 and identical to a sun gear 58 and three planet gear rollers 72, 74 and 76, identical to gear rollers 60, 62 and 64, having high friction covers 78 that engage shaft 54. A cover 78 is shown in the gear roller 72 in FIG. 2, but the covers are removed in FIG. 1 for purposes of clarity. The gear rollers 72, 74 and 76 are each provided with teeth 73 which mesh with the sun gear 70 and the teeth 48 on the ring gear 44. The planet gear roller 72 is larger than the other gear rollers 74 and 76 so that if functions like the planet gear 60 to provide a force vector $F_2$ which is equal and opposite to the force vector $F_1$ and maintains the ring 44 180° out of phase with respect to the ring gear 30. This location of the force vector $F_2$ is achieved by locating the gear roller 72 diametrically opposite the gear roller 60, the gear rollers 72, 74 and 76 being spaced 120° apart and located in-between the gear rollers 60, 62 and 64.

In the operation of the transmission 10, as the drive shaft 54 is rotated, the gear rollers 60, 62 and 64 are rotated about the stationary gear axis 28 to in turn generate the force vector $F_1$ which maintains the ring gear 30 in engagement with the stationary gear 14 and provide for rotation of the force vector $F_1$ to thereby cause the ring gear 30 to experience epicyclic motion relative to the stationary gear 14 and cause the ring gear axis 38 to orbit about the stationary gear axis 28. Similarly, rotation of the drive shaft 54 causes the gear rollers 72, 74 and 76 to generate the force vector $F_2$ and rotate the force vector $F_2$ so as to maintain the ring gear 44 180° out of phase with respect to the ring gear 30. This 180° out of phase arrangement of the ring gears 30 and 44 provides the assembly 10 with dynamic balance and in addition eliminates the need for high speed bearings since the only bearings required are the bearings 22, 24 and 56. In response to rotation of the force vectors $F_1$ and $F_2$, the ring gears 30 and 44 drive the output gear 18 so as to rotate it about the axis 28. A desired transmission ratio is obtained by providing the transmission 10 with stationary, output and ring gears having relative numbers of teeth necessary to obtain the desired ratio. The transmission ratio is determined by the following equation:

$$TR = \left[\frac{N_1}{N_1+N_3}\right]\left[\frac{N_6-N_4}{N_6}\right]$$

where:
$N_1$ = number of teeth on a sun gear 58 or 70;
$N_3$ = number of teeth 42 or 48 on the ring gears 30 and 44;
$N_4$ = number of teeth 16 on the stationary gear
$N_6$ = number of teeth 20 on the output gear 18.

In the transmission 10 a planet carrier is not required since the sideplates on the housing 12 function to maintain alignment of the planet gears. Paralleling of the transmission force vectors $F_1$ and $F_2$ between common input and output shafts enables the gear meshes to be located such that all reaction forces are completely balanced. In addition, the dynamic unbalance due to the eccentric ring gears 30 and 44 is cancelled by virtue of their arrangement so that they are 180° out of phase.

A modified form of the transmission of this invention, indicated generally at 10a, is shown in FIG. 5. Since the modified transmission 10a has the same components as the previously described transmission 10, the same numerals are used in FIG. 5 to indicate identical components previously described and the description of these parts is not repeated here. Only the components in the transmission 10a which are modified relative to the corresponding parts in the transmission 10 are described in detail hereinafter and to facilitate comparison of these parts with the corresponding parts in the transmission 10, like numerals are used with letter suffixes in FIG. 5 to indicate like parts in the transmission 10.

In the transmission 10a, the sections 32a and 34a of the ring gear 30a are not identical and the teeth 40a and 40b thereon are located on pitch circles of different diameters. Similarly, the ring gear 44a has two sets of teeth 46a and 46b located on pitch circles of different diameters corresponding to the diameters of the pitch circles on which the teeth 40a and 40b, respectively, are located. The teeth 40a and 46a mesh with the output gear 18a which has its teeth 20a located on a pitch circle smaller than the pitch circle on which the stationary gear teeth 16 are located.

In the operation of the transmission 10a, the drive shaft and cam assembly 52 operates to orbit the ring gears 30a and 44a about the axis 38 so that they experience epicyclic movement relative to the stationary gear 14 and drive the output gear 18a. The numbers of teeth on the gears is selected to provide a desired transmission ratio.

Another form of the transmission of this invention, indicated generally at 100, is illustrated in FIGS. 6 and 7. The transmission 100 includes a housing 102 carrying a bearing 104 on which an output gear 106 is rotatably mounted. The output gear 106 has external teeth 108 arranged in meshing engagement with internal teeth 110 on a floating ring gear 112. The ring gear 112 also has external teeth 114 which mesh with internal teeth 116 on a stationary gear 118 which is fixedly mounted on the housing 102. The output gear 106 and the stationary gear 118 are concentric with respect to an axis 120 and the ring gear 112 has an axis 122 which is eccentric with respect to the axis 120. In the transmission 100 the ring gear 112 is driven so as to orbit its axis 122 about the axis 120 and cause the gear 112 to experience epicyclic motion relative to the stationary gear 118 by a drive shaft and cam assembly 124. The assembly 124 consists of an internally splined drive shaft 126 which is rotatably supported on bearings 128 and 130 carried by the housing 102 and the ring gear 106, respectively, and a cam means consisting of a pair of rollers 132 and 134. As shown in FIG. 7, the rollers 132 and 134 engage the periphery of the drive shaft 126 and an internal roller surface 136 on the ring gear 112. Since the roller 132 is larger than the roller 134, they cooperate to generate a force F (FIG. 7) which maintains the ring gear 112 in meshing engagement with the stationary gear 118. As the drive shaft 126 is rotated, the force vector F rotates about the axis 120 so as to drive the ring gear 112 and in turn causes it to drive the output gear 106.

In the transmission 100, the rollers 132 and 134 are rotatably mounted on bearings 140 supported on a carrier 142 which is rotatably mounted on a sleeve bearing 144 on the housing 102. The carrier 142 thus functions to maintain the rollers 132 and 134 180° apart as shown in FIG. 7 so as to insure this relative position of the rollers 132 and 134 as the force vector F is rotated about the axis 120. It can thus be seen that the transmission 100 functions like the transmission 10 previously described to provide a desired transmission ratio, namely, the ratio of rotation of the force vector F relative to the rotation of the output shaft 106. This desired transmission ratio is readily obtained by providing the necessary number of teeth 108, 110, 114 and 116 to achieve this ratio.

What is claimed is:

1. A rotary-to-rotary transmission comprising stationary gear means having an axis, a rotatably mounted output gear arranged in a coaxial relation with said stationary gear means, floating ring gear means having an axis eccentric with respect to said stationary gear means axis and disposed in meshing engagement with said stationary gear means and said output gear, a drive shaft, eccentric roller means including at least two rollers engaged with said drive shaft at circumferentially spaced points thereon and with the inner circumference of said ring gear means at circumferentially spaced points thereon spaced different distances from said stationary gear axis, and means responsive in operation to rotation of said drive shaft for moving said roller means about said stationary gear axis.

2. A transmission according to claim 1 wherein said stationary gear means has a predetermined number of teeth and said ring gear has two sets of teeth, one of said sets being in meshing engagement with said stationary gear and the other one of said sets being in meshing engagement with said output gear, said one set having a number of teeth different than said predetermined number.

3. A transmission according to claim 2 wherein said ring gear means is positioned axially within said stationary gear means and cam means operable in response to rotation of said drive shaft for progressively moving the area of engagement of said ring and stationary gear means about the circumference of said stationary gear means.

4. A transmission according to claim 1 wherein said stationary gear means consists of a gear axially aligned with said output gear, said gears having radially inwardly directed teeth located on pitch circles of substantially the same diameter, said output gear having a number of teeth different from the number of teeth on said stationary gear.

5. A transmission according to claim 2 wherein said stationary gear means and said output gear have teeth arranged on pitch circles of different diameters and said two sets of ring gear teeth are arranged on pitch circles of different diameters.

6. A transmission according to claim 1 wherein said roller means comprises at least two rollers of different diameters.

7. A transmission according to claim 1 wherein said means for moving said roller means includes sun gear means on said drive shaft, and planet gear means integral with said roller means and disposed in meshing engagement with said sun gear means and said ring gear.

8. A transmission according to claim 7 wherein said means for moving said rollers comprises a rotatable carrier arranged in a supporting relation with said rollers.

9. A rotary-to-rotary transmission comprising a stationary gear, a rotatably mounted output gear, said gears being arranged in a concentric relation, a floating ring gear arranged in meshing engagement with said stationary and output gears, said ring gear having an axis arranged eccentric with respect to the axis of said stationary and output gears and being mounted for orbiting movement in which the axis thereof moves about said stationary and output gear axis, a drive shaft, and cam means responsive in operation to rotation of said drive shaft and engaged with said ring gear for applying a moving force vector to said ring gear moving in a path extending in one direction about said ring gear and cooperating with said meshing engagement of said gears so as to produce said orl movement and thereby provide for rotation of said ou gear, said cam means comprising a plurality of roller m bers, one of said members being of a larger diameter than remainder of the rollers.

10. A rotary-to-rotary transmission comprising station gear means having teeth arranged in a circular formal about an axis, coaxial rotatable output gear means ha\ teeth arranged in a circular formation about said axis, a pai floating ring gears spaced apart in a direction along said a each of said ring gears having an axis eccentric to said tionary gear means axis, said ring gears being meshingly gaged with diametrically opposite portions of said station gear means so that the axes of said ring gears are disposed s stantially 180° apart on opposite sides of said stationary g means axis, a drive shaft and cam assembly engaged with s ring gears and operable on rotation of said assembly to m said ring gears in unison so that the axes thereof orbit ab said stationary gear means axis, and coacting meshing teeth said output gear means and said ring gears providing for rc tion of said output gear means in response to said movem of said ring gears.

11. A transmission according to claim 10 wherein said o put and stationary gear means are axially aligned and h; radially inwardly directed teeth located on pitch circles of st stantially the same diameter, said output gear having a numl of teeth different from the number of teeth on said station; gear.

12. A transmission according to claim 10 wherein each said ring gears has two sets of teeth disposed on pitch circles different diameters, one set being engaged with said station; gear means and the other set being engaged with said outp gear means, said output and stationary gear means havi radially inwardly directed teeth arranged on pitch circles different diameters.

13. A transmission according to claim 10 wherein said dri shaft and cam assembly comprises a drive shaft concent: with said stationary gear, a pair of sun gear members on sa shaft in substantial radial alignment with said ring gears, a s of planet gear roller members corresponding to and driven each of said sun gear members and arranged in meshing e gagement with one of said ring gear members, said gear roll members being in rolling engagement with said shaft and sa ring gears, and one of the gear roller members in each of sa sets being larger than the other members in said set so as maintain the eccentric relation of ring gears and said station ry gear and maintain said ring gears in engagement with sa stationary gear.